(12) United States Patent
Keyser

(10) Patent No.: US 10,384,617 B1
(45) Date of Patent: Aug. 20, 2019

(54) ATV LOADER/CARRIER SYSTEM

(71) Applicant: Charles Royce Keyser, Auburndale, FL (US)

(72) Inventor: Charles Royce Keyser, Auburndale, FL (US)

(*) Notice: Subject to any disclaimer, the term of this patent is extended or adjusted under 35 U.S.C. 154(b) by 104 days.

(21) Appl. No.: 13/919,220

(22) Filed: Jun. 17, 2013

(51) Int. Cl.
B60R 9/06 (2006.01)
B60P 1/14 (2006.01)
B60P 1/44 (2006.01)

(52) U.S. Cl.
CPC ............. B60R 9/06 (2013.01); B60P 1/14 (2013.01); B60P 1/4407 (2013.01)

(58) Field of Classification Search
USPC ....... 224/410, 502, 408, 504, 401–403, 488, 224/495, 498–499, 505–508; D12/107, D12/407; 280/769; 414/462–466
See application file for complete search history.

(56) References Cited

U.S. PATENT DOCUMENTS

| | | | | |
|---|---|---|---|---|
| 3,103,289 A * | 9/1963 | Clary | ............................ | 414/462 |
| 5,456,564 A * | 10/1995 | Bianchini | ..................... | 414/462 |
| 6,461,095 B1 * | 10/2002 | Puska | ............................ | 414/462 |
| 7,293,951 B2 * | 11/2007 | Meeks | ............................ | 414/462 |
| 2002/0168257 A1 * | 11/2002 | Smith et al. | .................. | 414/462 |
| 2005/0254925 A1 * | 11/2005 | Braquet | ....................... | 414/462 |
| 2007/0196199 A1 * | 8/2007 | Evans | ............................ | 414/466 |
| 2008/0292435 A1 * | 11/2008 | Turner et al. | ................ | 414/462 |
| 2010/0170924 A1 * | 7/2010 | Johnson | ....................... | 224/413 |

* cited by examiner

Primary Examiner — Justin M Larson

(57) ABSTRACT

A fixed frame has upper, lower, and lateral bars in a vertical frame. A movable frame has inner, outer, and side bars in a horizontal plane. The movable frame includes forward, rearward, and side panels. Hinges pivotably couple the side panels to the side bars allowing movement between a horizontal lowered orientation for loading and unloading cargo and a horizontal raised orientation for transporting cargo. Motion imparting mechanisms couple the movable frame with respect to the fixed frame for moving the movable frame between the lowered and raised orientations.

5 Claims, 5 Drawing Sheets

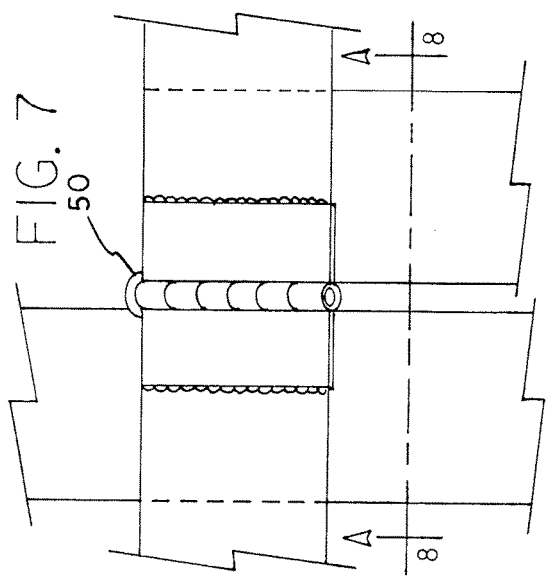
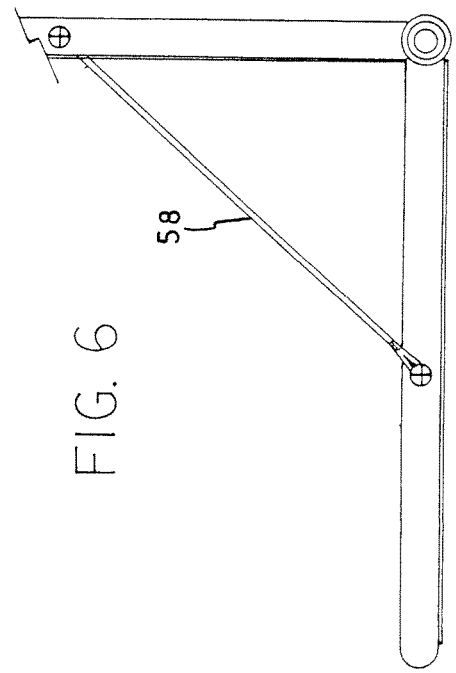
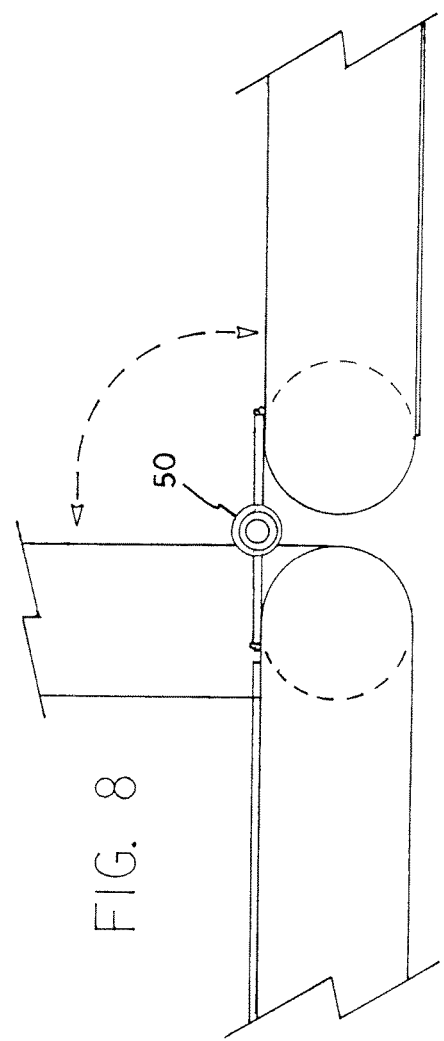

ATV LOADER/CARRIER SYSTEM

BACKGROUND OF THE INVENTION

Field of the Invention

The present invention relates to an ATV loader/carrier system and more particularly pertains to facilitating the loading and unloading of cargo with respect to an ATV and for transporting cargo loaded on the ATV, the loading and unloading and transporting being done in a safe, convenient and economical manner.

SUMMARY OF THE INVENTION

In view of the foregoing disadvantages inherent in the known types of vehicle transporting systems of known designs and configurations now present in the prior art, the present invention provides an improved ATV loader/carrier system. As such, the general purpose of the present invention, which will be described subsequently in greater detail, is to provide a new and improved ATV loader/carrier system and method which has all the advantages of the prior art and none of the disadvantages.

To attain this, the present invention essentially comprises a fixed frame. The fixed frame has upper, lower and, lateral bars provided in a vertical frame.

A movable frame has inner, outer, and side bars in a horizontal plane. The movable frame includes forward, rearward, and side panels. Hinges pivotably couple the side panels to the side bars. In this manner movement between a horizontal lowered orientation and a horizontal raised orientation is allowed. The horizontal lower orientation allows for loading and unloading cargo. The horizontal raised orientation allows for transporting cargo.

Motion imparting mechanisms couple the movable frame with respect to the fixed frame for moving the movable frame between the lowered and raised orientations.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved ATV loader/carrier system which has all of the advantages of the prior art vehicle transporting systems of known designs and configurations and none of the disadvantages.

It is another object of the present invention to provide a new and improved ATV loader/carrier system which may be easily and efficiently manufactured and marketed.

It is a further object of the present invention to provide a new and improved ATV loader/carrier system which is of durable and reliable constructions.

An even further object of the present invention is to provide a new and improved ATV loader/carrier system which is susceptible of a low cost of manufacture with regard to both materials and labor, and which accordingly is then susceptible of low prices of sale to the consuming public, thereby making such ATV loader/carrier system economically available to the buying public.

Lastly, another object of the present invention is to provide an ATV loader/carrier system for facilitating the loading and unloading of cargo with respect to an ATV and for transporting cargo loaded on the ATV, the loading and unloading and transporting being done in a safe, convenient and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is an end elevational view of a side panel taken along line 6-6 of FIG. 5.

FIG. 7 is a plan view of an optional hinge area of a side panel of a loader/carrier assembly.

FIG. 8 is a cross sectional view taken along line 8-8 of FIG. 7, FIG. 8 actually being an optional hinge attachment method.

The same reference numerals refer to the same parts throughout the various Figures of the preferred embodiment of the invention.

DESCRIPTION OF THE PREFERRED EMBODIMENT

Figure 1:
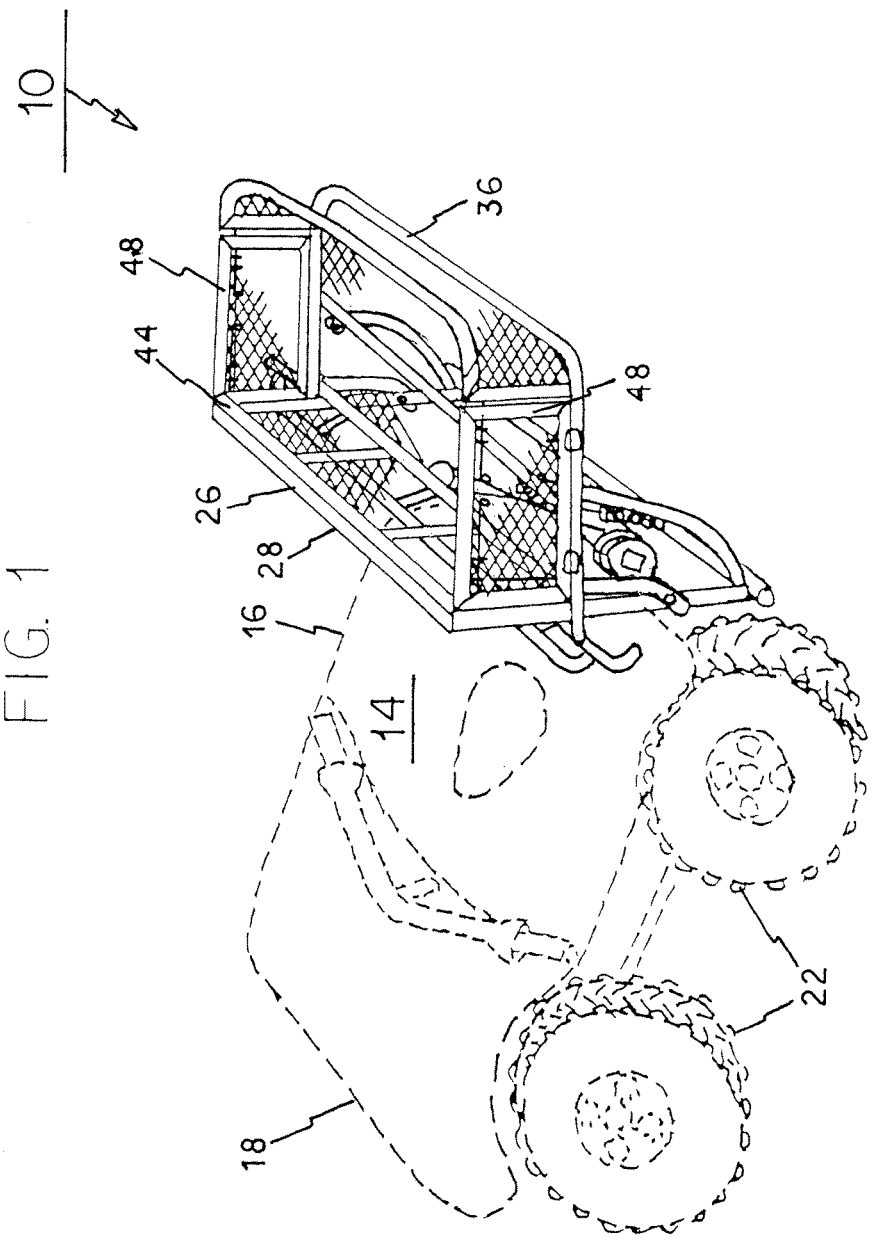
FIG. 1 is a perspective illustration of an ATV loader/carrier system constructed in accordance with the principles of the present invention.
Figure 2:
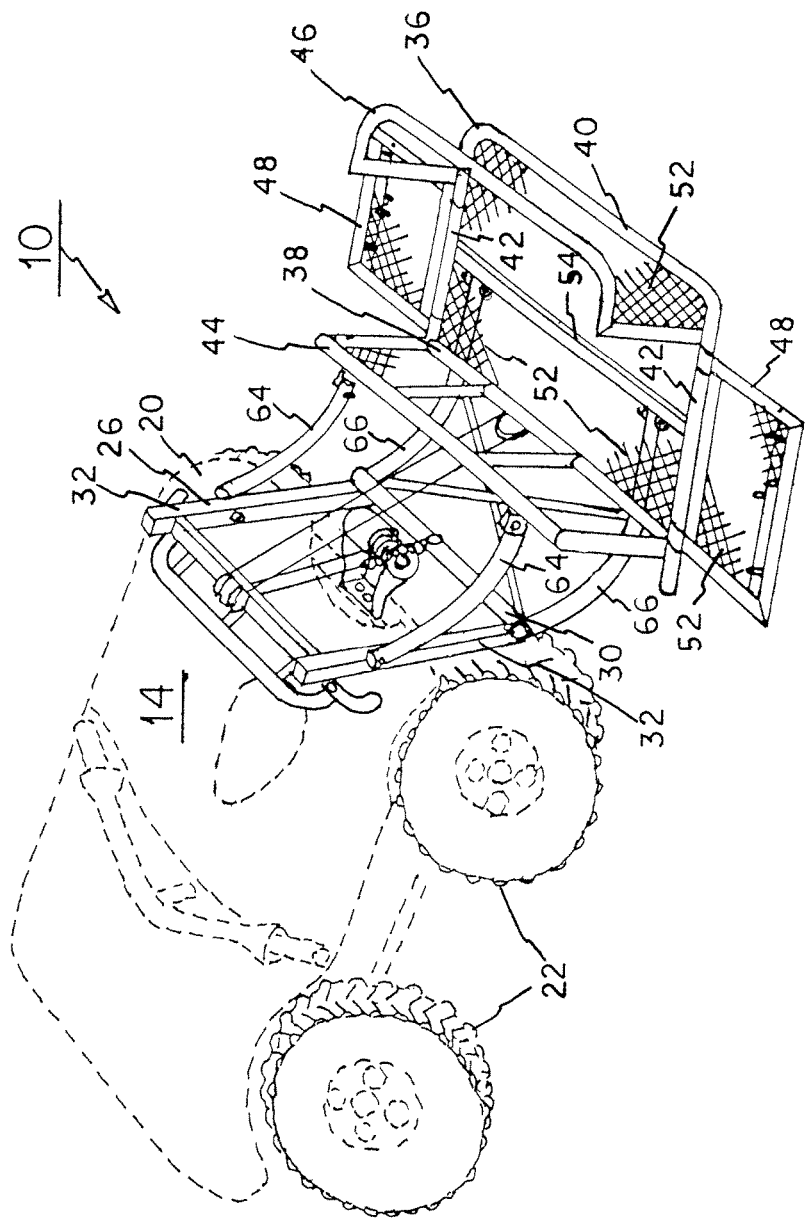
FIG. 2 is a perspective illustration similar to FIG. 1 but showing the ATV loader/carrier assembly in a lower loading/unloading orientation.
Figure 3:
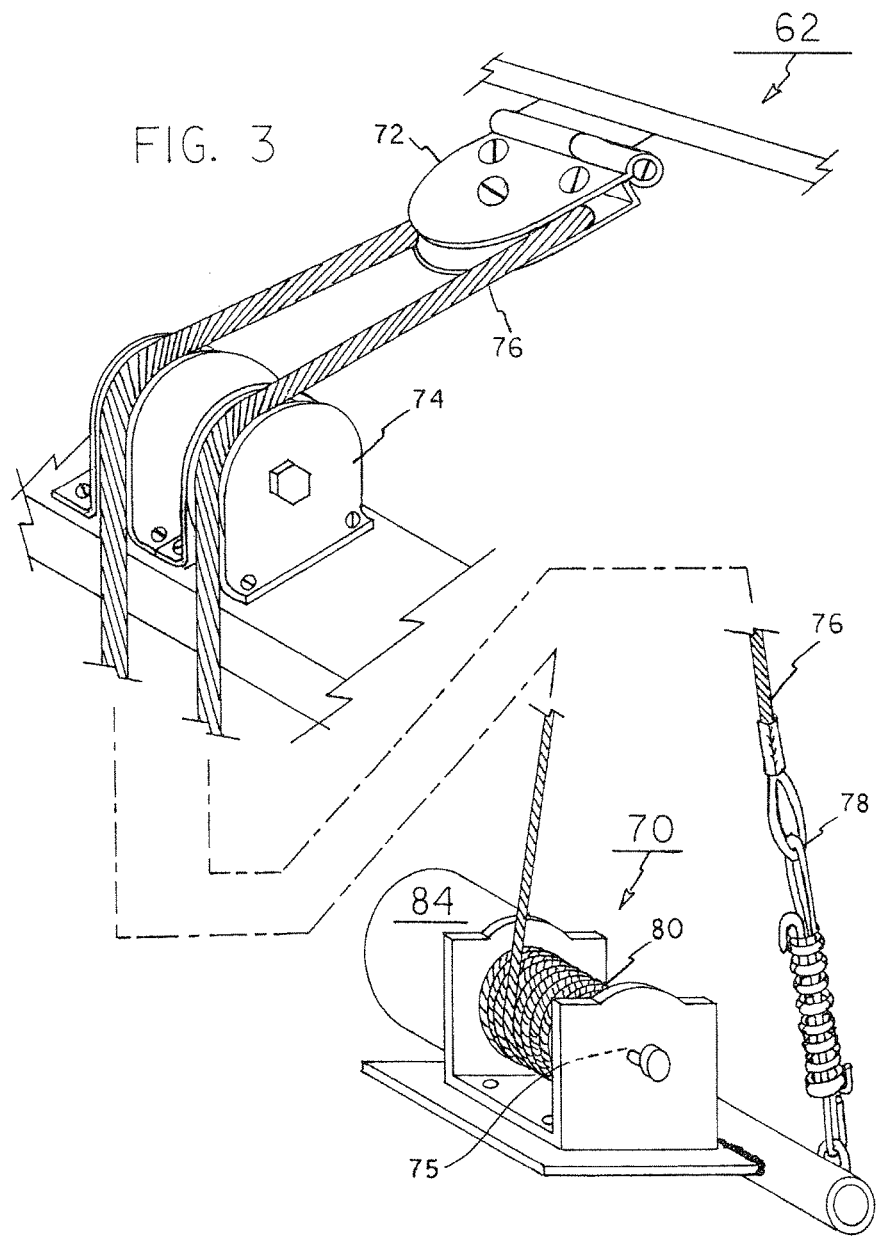
FIG. 3 is an enlarged perspective illustration of the exterior and interior regions of the motion imparting assembly.
Figure 4:
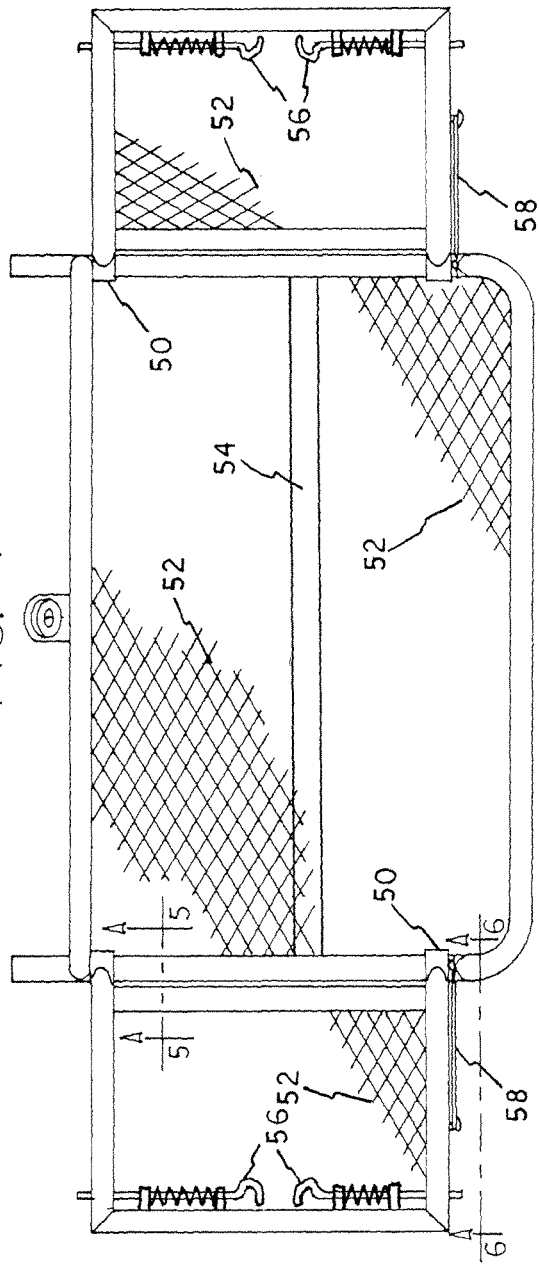
FIG. 4 is a plan view of the ATV loader/carrier assembly with the side panels lowered.
Figure 5:
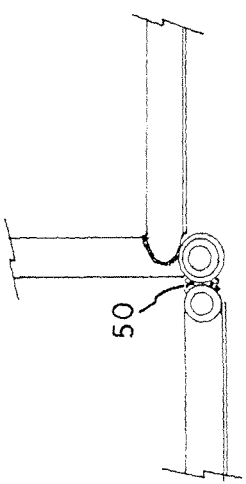
FIG. 5 is a cross sectional view taken along line 5-5 of FIG. 4.

With reference now to the drawings, and in particular to FIG. 1 thereof, the preferred embodiment of the new and improved ATV loader/carrier system embodying the principles and concepts of the present invention and generally designated by the reference numeral 10 will be described.

The present invention, the ATV loader/carrier system 10 is comprised of a plurality of components. Such components in their broadest context include a fixed frame, movable frame, and a motion imparting mechanism. Such components are individually configured and correlated with respect to each other so as to attain the desired objective.

An ATV 14 is provided. The ATV includes a body 16. The body has a front 18. The front is provided forwardly. The body has a rear 20. The rear is provided rearwardly. The body has four wheels 22. The wheels are adapted to be positioned at ground level during operation and use. The preferred embodiment of the present invention as illustrated includes an ATV, an all terrain vehicle. It should be understood, however, that the invention is also capable of use on a wide variety of other vehicles including a UTV, a utilitarian vehicle, such as a golf cart, a mini-pick up truck, and like vehicles.

A fixed frame 26 is provided. The fixed frame is attached to the rear of the ATV. The fixed frame has an upper bar 28. The fixed frame has a parallel lower bar 30. The fixed frame has parallel lateral bars 32 forming the sides. In this manner the fixed frame is formed into a rectangular configuration in a vertical plane.

Provided next is a movable frame 36. The movable frame is operatively coupled to the fixed frame. The movable frame has an inner bar 38. The movable frame has a parallel outer bar 40. The movable frame has parallel side bars 42. In this manner a movable floor with a rectangular configuration is formed in a horizontal plane. The movable frame includes a forward panel 44. The forward panel is provided in a rectangular configuration. The forward panel is attached to and extends upwardly from the inner bar. The movable frame includes a rearward panel 46. The rearward panel is in a generally rectangular configuration. The rearward panel is attached to and extends upwardly from outer bar. The movable frame includes two similarly configured side panels 48. The side panels are in a rectangular configuration. Hinges 50 are provided. The hinges pivotably couple the side panels to the side bars. In this manner movement between a horizontal orientation and a vertical orientation is allowed. The horizontal orientation allows for loading and unloading cargo. The vertical orientation allows for transporting cargo. Screen material 52 is provided. The screen material fills out the floor and the rear panel and the side panels.

It should be understood a wide variety of hinges may be readily utilized in the system of the present invention. Further, the hinge points, the axes of rotation, may be repositioned on different systems as required by the geometry of the particular system.

A brace bar 54 is provided. The brace bar is attached to the side bars of the movable frame beneath the floor and its screen material. Locks 56 are provided. Each lock is laterally slidable with respect to each side panel. In this manner each side panel is retained in a vertical orientation. A cable 58 is provided. In this manner the downward movement of each side panel to a horizontal orientation is limited. Instead of a cable, a cord or other equivalent component could be readily utilized.

A motion imparting assembly 62 is provided next. The motion imparting assembly couples the movable frame with respect to the fixed frame. The motion imparting assembly includes upper links 64. The upper links have inner ends. The inner ends are pivotably attached to the lateral bars adjacent to the upper bar of the fixed frame. The upper links have outer ends. The outer ends are pivotably attached to the upper bar of the forward panel. The motion imparting assembly includes lower links 66. The lower links have inner ends. The inner ends are pivotably attached to the lateral bars adjacent to the lower bar of the fixed frame. The lower links have outer ends. The outer ends are pivotably coupled to the brace bar of the floor of the movable frame. The upper links and the lower links are curved in the disclosed preferred embodiment as illustrated. The upper links and the lower links have a center of curvature above the system when the movable frame is in the lower orientation. The upper links and the lower links have a center of curvature forwardly of the system when the movable frame is in the raised orientation. The upper and lower links are adapted to take other shapes as a function of the particular application.

Further provided is a winch assembly 70. The winch assembly has a pivotable pulley 72. The pivotable pulley is coupled to the inner bar. The winch assembly includes a dual pulley 74. The dual pulley is rotatably attached to the upper bar of the fixed frame. A rotatable drum 75 is provided. The rotatable drum is attached to the fixed frame in proximity to the rear of the ATV. The winch assembly includes a cable 76. The cable has a fixed end 78. The fixed end is attached to the lower bar of the fixed frame by way of a tension spring. The cable has a movable end 80. The movable end is attached to the rotatable drum.

Provided last a motion imparting device illustrated as a motor 84. The motor is attached to the drum. In this manner rotation of the drum in a winding motion is initiated. Also in this manner the movable frame and lift cargo is raised. At least a portion of the movable frame and cargo are above the ATV. Further in this manner stability is increased. The motor is adapted to initiate rotation of the drum in an unwinding motion. In this manner the movable frame is lowered. Also in this manner the floor is positioned at ground level. Further in this manner when the side panels are lowered cargo may be easily dragged onto the floor for transporting purposes. The motor is operable to raise and lower the movable frame by hard wire controls and/or through a remote control mechanism. It should be understood that a wide variety of motion imparting devices such as a gear drive, hydraulic mechanisms, pneumatic mechanisms, and the like, could be readily utilized as a function of the particular application.

The most stable configuration is to have the center of gravity as low as possible and as forward as possible, preferably in front of the rear wheels. The objective in the design is to end up with the bottom of the basket approximately at the same height as the rear cargo rack for ground clearance on uneven terrain. For stability, the center of gravity should be as far forward as possible. The present configuration provides for a good combination of stability and ground clearance.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicle loader/carrier system comprising:
   a fixed frame formed of upper and lower and lateral bars in a vertical plane;
   a movable frame formed of inner and outer and side bars in a horizontal plane, the movable frame including forward and rearward and side panels and a floor, hinges pivotably coupling the side panels to the side bars for movement of the side panels between a horizontal orientation for loading and unloading cargo and a vertical orientation for transporting cargo;
   motion imparting mechanisms coupling the movable frame with respect to the fixed frame for moving the movable frame between a lowered orientation and a raised orientation, the motion imparting mechanisms including:
      upper links having inner ends pivotably attached to the lateral bars adjacent to the upper bar, the upper links having outer ends pivotably attached to the upper bar, and
      lower links having inner ends pivotably attached to the lateral bars adjacent to the lower bar, the lower links having outer ends pivotably coupled to the floor of the movable frame, the upper links and the lower links being curved with a center of curvature above the system when the movable frame is in the lowered orientation and with a center of curvature forwardly of the system when the movable frame is in the raised orientation.

2. The system as set forth in claim 1 and further including:
   an all terrain vehicle having a front and a rear; and
   attachment mechanisms coupling the fixed frame to the rear of the all terrain vehicle.

3. A vehicle loader/carrier system comprising:
   a fixed frame formed of upper and lower and lateral bars in a vertical plane;
   a movable frame formed of inner and outer and side bars in a horizontal plane, the movable frame including forward and rearward and side panels and a floor, hinges pivotably coupling the side panels to the side bars for movement of the side panels between a horizontal orientation for loading and unloading cargo and a vertical orientation for transporting cargo;
   motion imparting mechanisms coupling the movable frame with respect to the fixed frame for moving the movable frame between a lowered orientation and a raised orientation; and
   a winch assembly having a pivotable pulley coupled to the inner bar of the movable frame, the winch assembly including a dual pulley rotatably attached to the upper bar of the fixed frame and a rotatable drum attached to the fixed frame in proximity to a rear of a vehicle, the winch assembly having a cable extending over the pivotable pulley and the dual pulley, the cable having a fixed end attached to the lower bar of the fixed frame through a tension spring, the cable having a movable end attached to the rotatable drum.

4. The system as set forth in claim 3 and further including:
   a motion imparting mechanism attached to the drum to initiate rotation of the drum in a winding motion to raise the movable frame and lift cargo thereupon with at least a portion of the movable frame and cargo above the vehicle for increased stability, the motion imparting mechanism adapted to initiate rotation of the drum in an unwinding motion to lower the movable frame and positioning the floor at ground level whereby when the side panels are lowered cargo may be easily moved onto the floor for transporting purposes.

5. An ATV, all terrain vehicle, loader/carrier system (10) for facilitating the loading and unloading of cargo with respect to an ATV (14) and for transporting cargo loaded on the ATV, the loading and unloading and transporting being done in a safe, convenient and economical manner, the system comprising, in combination:
   the ATV (14) including a body (16) with a front (18) forwardly and a rear (20) rearwardly and four wheels (22), the wheels adapted to be positioned at ground level during operation and use;
   a fixed frame (26) attached to the rear of the ATV, the fixed frame formed of an upper bar (28) and a parallel lower bar (30) and parallel lateral bars (32) forming the fixed frame into a rectangular configuration in a vertical plane;
   a movable frame (36) operatively coupled to the fixed frame, the movable frame formed of an inner bar (38) and a parallel outer bar (40) and parallel side bars (42) forming a movable floor with a rectangular configuration in a horizontal plane, the movable frame including a forward panel (44) in a rectangular configuration attached to and extending upwardly from the inner bar, the movable frame including a rearward panel (46) in a generally rectangular configuration attached to and extending upwardly from outer bar, the movable frame including two similarly configured side panels (48) in a rectangular configuration, hinges (50) pivotably coupling the side panels to the side bars for movement between a horizontal orientation for loading and unloading cargo and a vertical orientation for transporting cargo, screen material (52) filling out the floor and the rear panel and the side panels, a brace bar (54) attached to the side bars of the movable frame beneath the floor and its screen material, locks (56) laterally slidable with respect to each side panel for retaining each side panel in a vertical orientation, a cable (58) limiting the downward movement of each side panel to a horizontal orientation;
   a motion imparting assembly (62) coupling the movable frame with respect to the fixed frame, the motion imparting assembly including upper links (64) having inner ends pivotably attached to the lateral bars adjacent to the upper bar of the fixed frame, the upper links having outer ends pivotably attached to the upper bar of the forward panel, the motion imparting assembly including lower links (66) having inner ends pivotably attached to the lateral bars adjacent to the lower bar of the fixed frame, the lower links having outer ends pivotably coupled to the brace bar of the floor of the movable frame, the upper links and the lower links being curved with a center of curvature above the system when the movable frame is in the lower orientation and with a center of curvature forwardly of the system when the movable frame is in the raised orientation;

a winch assembly (70) having a pivotable pulley (72) coupled to the inner bar of the movable frame, the winch assembly including a dual pulley (74) rotatably attached to the upper bar of the fixed frame, the winch assembly also including a rotatable, drum (75) attached to the fixed frame in proximity to the rear of the ATV, the winch assembly having a cable (76) with a fixed end (78) attached to the lower bar of the fixed frame through a tension spring, the cable having a movable end (80) attached to the rotatable drum; and a motor (84) attached to the drum to initiate rotation of the drum in a winding motion to raise the movable frame and lift cargo with at least a portion of the movable frame and cargo above the ATV for increased stability, the motor adapted to initiate rotation of the drum in an unwinding motion to lower the movable frame and positioning the floor at ground level whereby when the side panels are lowered cargo may be easily dragged onto the floor for transporting purposes.

* * * * *